Oct. 1, 1963   M. MOLLICK   3,105,514
INSTRUMENT
Filed Oct. 5, 1959   2 Sheets-Sheet 1
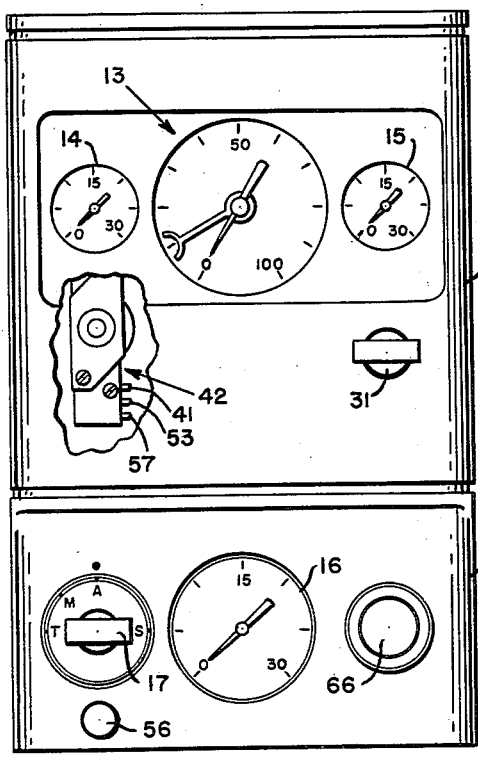
FIG. 1
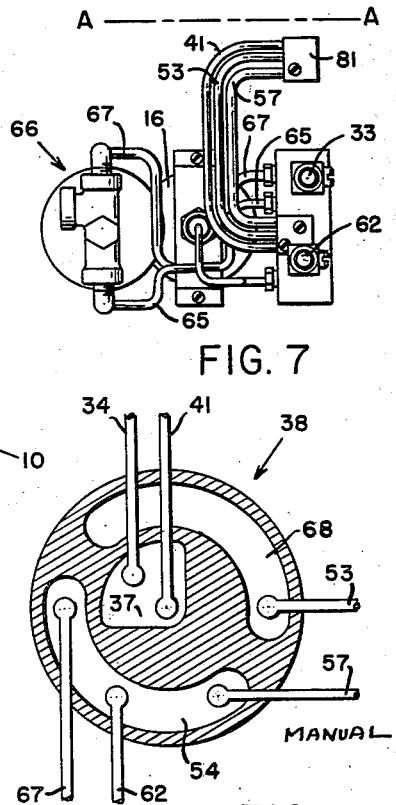
FIG. 7
FIG. 3 MANUAL
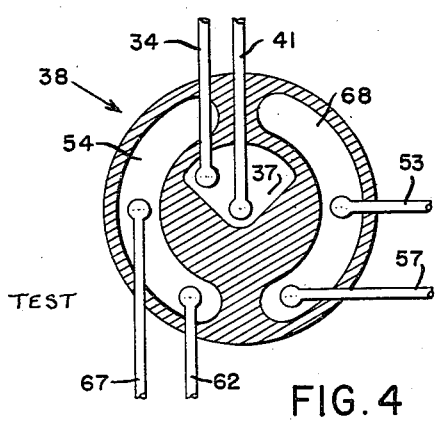
FIG. 4 TEST
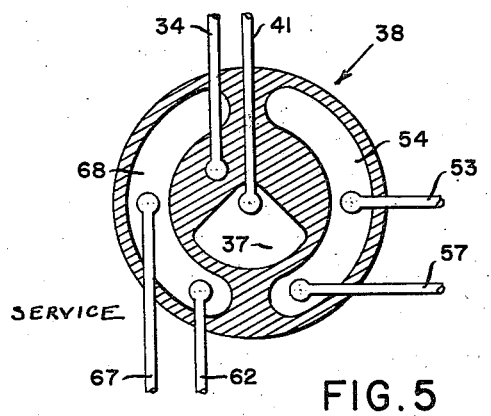
FIG. 5 SERVICE
INVENTOR.
MILTON MOLLICK
BY
ATTORNEYS

United States Patent Office 3,105,514
Patented Oct. 1, 1963

3,105,514
INSTRUMENT
Milton Mollick, Allentown, Pa., assignor to
Ametek, Inc., a corporation of Delaware
Filed Oct. 5, 1959, Ser. No. 844,420
6 Claims. (Cl. 137—488)

This invention relates to pneumatically operated instruments suitable for use in controlling industrial processes and responsive to a measurable variable of the process.

It is known to employ a measurable variable, such as temperature, pressure, flow or the like, to position a valve or flapper and nozzle relatively to each other so as to vary the air pressure in the nozzle in accordance with the measurable variable. The nozzle may be connected to a supply of air through a restriction so that as the valve or flapper is moved toward a closed position relatively to the nozzle by variations in the measurable variable or condition of a process, air pressure in the nozzle will rise and vice versa. The controlled air pressure normally may be employed to operate a pressure relay. A follow-up or feedback means, responsive to the output pressure from the relay, may be connected to the nozzle or flapper in such a manner as to tend to return the flapper and nozzle to their original relative positions after having been moved in response to a change in the measurable variable. The output from the pressure relay may be employed automatically to operate a device for varying a condition of the process from which the measurable variable originates. The term "controller" will be employed in this application to generally refer to the above recited structure.

In such systems, it is known to provide a manually controlled regulator for operating the device for varying the condition of the process from which the measurable variable originates. It is usual initially to employ the manually controlled regulator until the process is functioning in a desired manner, after which it is usual to transfer the control of the control device over to the pressure relay for automatic operation of the control device during the continued functioning of the process from which the measurable variable originates.

It is important in such arrangements that after the control device has been controlled manually to satisfy a desired condition of the process, the condition of the pressure relay and feedback be such that upon transferring the control of the control device to automatic control, no change in the condition of the process ensues. When transferring from automatic to manual control, the manual loading pressure must be exactly matched to the automatic prior to transfer. If the proper relationship is not maintained, serious disturbances may occur in the process, thereby detrimentally affecting the end result of the process being controlled.

It is customary to provide means for adjusting the "set" condition of the flapper and nozzle so that prior to transferring the control of the controlled device from automatic to manual or vice versa, the output pressure of the relay of the controller can be matched with the pressure obtaining at the controlled device under the influence of the manual regulator.

It has heretofore been proposed to employ separate gauges for determining and indicating this matched pressure condition, but such arrangements do not provide sufficiently accurate results due, among other reasons, to the fact that the error in separate gauges is never the same so that although the separate gauges may indicate a desired matched pressure condition, such may not be, and often is not, the case.

Prior known transfer valves for changing the control from automatic to manual, or vice versa, as well as for changing it to a condition for testing and also servicing, require relatively small angular movements of the valve in order to accommodate all four conditions within a partial revolution of the valve. This arrangement necessitates relatively critical positioning of the transfer valve, detracting from the ease of operation thereof.

It is an object of this invention to provide a pneumatic control instrument of generally the above described type in which no variation in control of the controlled device occurs in transferring control thereof from an automatically operated pressure relay for automatically controlling said device to a manually controlled regulator for manually controlling said device, or vice versa.

Another object of the invention is to provide such an instrument that is capable of measuring and controlling industrial processes requiring a high degree of accuracy of measurement and control, and which instrument is readily and simply applied to various processes.

Another object of this invention is to provide such an instrument that includes a transfer valve for transferring the control between automatic, manual, testing and servicing conditions with relatively large, non-critical, angular motions.

Another object of this invention is to provide such an instrument including a controller for automatically controlling a process that is separable from a "by-pass" unit including a manually operable regulator for manually controlling the process.

In one form of the invention, an automatic controller or pilot may include a measuring device such as a Bourdon tube or the like which may be employed to operate an arm that controls the movement of a flapper relatively to a nozzle. The measuring device could be in the form of bellows, wafers, bimetallic elements or similar devices. The Bourdon tube movement may be a conventional gauge movement having mounted concentrically therewith a pointer to give an indication of the measurable variable and may also have mounted concentrically therewith a second gauge movement with a "set point" indicator connected to a carrier supporting the nozzle. Adjustable means may be provided for the nozzle supporting carrier so that the nozzle may be adjusted relatively to the flapper. The flapper may also be connected to a feedback mechanism which may include a device responsive to the output pressure of a pressure relay that controls the controlled device. In this way, any variation in the measurable variable acts on the Bourdon tube to control the flapper relatively to the nozzle, resulting in a change in output pressure from the relay which through the feedback device tends to return the flapper relatively to the nozzle to an initial preset relationship.

In one aspect of the invention, a disc-type transfer valve may be employed in which a line from a supply of air under controlled pressure and a line leading to the pressure relay may communicate with each other within a port located at the center of the transfer valve, and two kidney-shaped ports concentric with the center port may be employed to selectively establish communication between a line from the outlet from the pressure relay, a line leading to the feedback device and a line leading from the manual regulator.

In still another aspect of the invention, an axially displaceable valve may be provided for selectively connecting the outlets from the manual regulator and the pressure relay of the controller to a single transfer gauge, without interconnecting either of the outlets to each other. With such a construction, the manually controlled regulator may be adjusted so that in transferring from automatic control to manual control or vice versa, no variation of the controlled device will occur.

In still another aspect of the invention, the arrangement of the controller including the automatically operated relay and its associated parts may be separated as a unit from the "by-pass" unit including the manually controlled regulator and its associated parts while still maintaining the controlled device under the influence of the manually controlled regulator.

The above, other objects and novel features of the invention will become apparent from the following specification and accompanying drawings which are merely exemplary.

In the drawings:

FIG. 1 is a front elevational view of an instrument to which the principles of the invention have been applied;

FIGS. 3, 4 and 5 are sectional views of different control positions of a valve shown in FIG. 2;

FIG. 7 is a view of the back of the lower portion of FIG. 1.

Figures 2, 6:
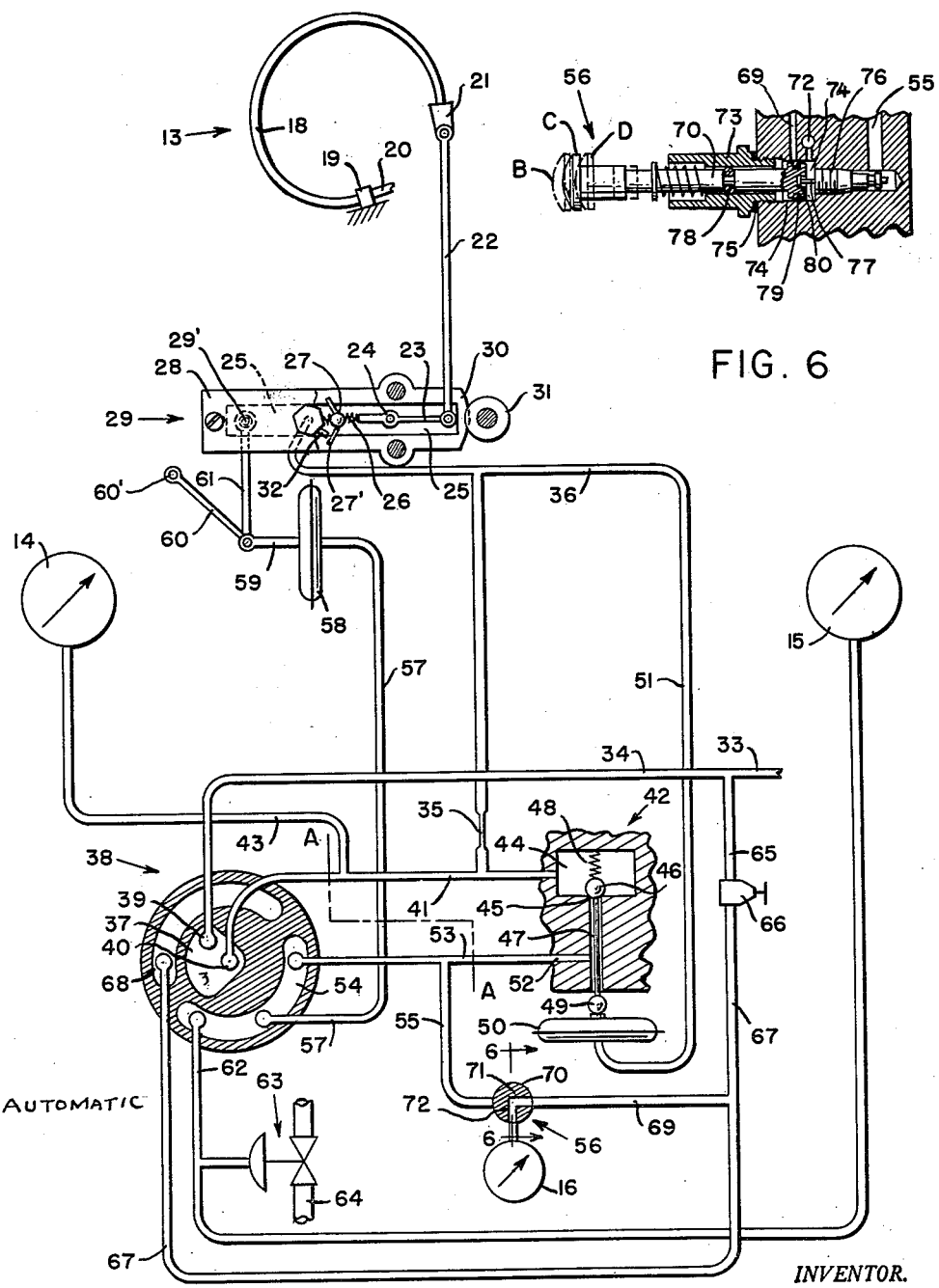
FIG. 2 is a schematic diagram of certain of the elements within the instrument shown in FIG. 1.
FIG. 6 is an enlarged sectional view taken substantially along line 6—6 of FIG. 2.

Referring to the drawings and particularly to FIG. 1, the principles of the invention are shown as applied to a pneumatic instrument including a housing 10 having an upper compartment 11 and a lower compartment 12. The upper compartment may encase a controller including a measuring and indicating gauge 13 that is adapted to be connected to the measurable variable and an air supply gauge 14 that is adapted to be connected to supply of air and to a pressure relay 42. An output pressure gauge 15 also may be included within compartment 11 and it is adapted to be connected to the output pressure from the controller for indicating the pressure employed to operate a controlled device for affecting the condition of an industrial process or the like from which the measurable variable originates.

The lower compartment 12 may encase a "by-pass" unit including a transfer gauge 16 and a transfer valve adapted to be turned to different angular positions by a knob 17. It may also encase a valve 56 adapted to be axially moved by a push button, and a manually controlled regulator 66 (FIG. 2).

The controller including the gauges 13, 14 and 15 may be of different forms. The one shown is specifically described in U.S. Patent 2,770,247 to William D. Huston, to which patent reference is made for an understanding of details not specifically described herein. Only those elements of the controller of Patent 2,770,247 necessary to an understanding of this invention will specifically be described herein.

Referring to FIG. 2, the measuring and indicating gauging or member 13 is shown as comprising a conventional Bourdon tube 18 having its one end connected to a rigidly mounted inlet block or socket 19 to which a line 20 is connected that leads from the process desired to be controlled. The free end 21 of the Bourdon tube 18 may be connected through a link 22 to a lever 23 fixed to a pivot shaft 24 that is oscillatably mounted between two parallel plates 25 (only one of which is shown) constituting a differential carriage. The end of lever 23 opposite that connected to link 22 is provided with a resilient or other type of connector 26 that passes through a pivot shaft 27 that extends through an upper plate 28 of an adjustable carrier 29. The carrier 29 is pivotally mounted on an axis 29', and the lower parallel plate 30 thereof engages a rotatable friction device 31 for adjusting the set point of the controller, all as more specifically described in the above-referred-to Patent 2,770,247. A flapper 27' is fixed to the upper end of shaft 27. A nozzle 32 is fixedly attached to the upper plate 28 of carrier 29 in position to cooperate with the flapper 27'. Air from a regulated supply line 33 passes through a line 34 to a central port 37 of a rotatable disc-like transfer valve 38. This port 37 has a specific configuration for a purpose to be described later, and, as shown in FIG. 2, provides communication between the end 39 of line 34 and an end 40 of a line 41 leading to a pressure relay 42. A branch 43 from line 41 leads to the supply air pressure gauge 14 (FIGS. 1 and 2), and another branch from line 41 including a restriction 35 leads to a line 36 having one branch connected to the nozzle 32.

The pressure relay 42 may comprise a chamber 44 to which line 41 is connected. An exit 45 from chamber 44 is adapted to be closed by one end 46 of a valve 47 that is backed up by a spring 48 within chamber 44. The other end 49 of valve 47 is adapted to cooperate with a diaphragm 50 that is supplied by air from a branch 51 of line 36.

An outlet 52 of the pressure regulator 42 may be connected to a line 53 leading to a kidney-shaped port 54 in valve 38, while a branch 55 of line 53 leads to a valve 56 for a purpose to be described later. With the valve 38 in the position shown in FIG. 2, the port 54 thereof establishes communication between line 53 and a line 57 leading to a bellows 58 of a feedback system. The feedback system may includes a link 59 having its one end connected to the bellows 58 and its other end pivotally attached to one end of a lever 60, the other end of which is pivotally mounted on an adjustable support 60', all as more fully explained in Patent 2,770,247. A link 61 has its one end pivotally fixed to the link 59, and its opposite end connected to the plate 25 independent of the axis 29'. The port 54 in the position shown in FIG. 2 also provides communication between line 53 and a line 62 leading to a pressure operated control valve 63 within a line 64 supplying a desired medium to the industrial process being controlled.

The construction and arrangement of the parts are such that the measurable variable from the process being controlled acts on the Bourdon tube 18 through the line 20, causing link 22 to turn lever 23 in a manner to vary the pressure of air in nozzle 32, thus varying the pressure in line 51 and consequently causing the diaphragm 50 to act on valve 47 to vary the pressure of air in line 53 and hence in line 62. This causes variation of the controlled element 63 to change the pressure of fluid in line 64 leading to the process. It also varies the air pressure in line 57 activating the bellows 58, thereby causing the linkage 59, 61 to turn the plate 25 about the axis of shaft 27 in a manner to return the flapper 27' to an initially preset relation relatively to the nozzle 32. When this relationship is re-established, the air pressure in line 51 returns the valve 47 to the position shown in FIG. 2, causing return of valve 63 to a new position. In this way, the process is automatically controlled in a manner to maintain a desired condition therein.

The supply line 33 is also connected to a line 65 leading to a manually operated regulating valve 66 which latter is connected to another line 67 leading to a port 68 of valve 38. With valve 38 in the position shown in FIG. 2, the port 68 is not in communication with any other line, hence the manual regulator 66 is ineffective. A branch 69 from line 67 leads to valve 56. The valve 56 may comprise a cylindrical element 70 (shown schematically in FIG. 2) that is axially displaceable to two positions and normally spring-urged to the position shown in FIG. 2 where ports 71 and 72 thereof communicate with the transfer gauge 16 (FIGS. 1 and 2). A more detailed description of element 70 will be given later as applied to FIG. 6. With the element 70 in the position shown in FIG. 2, pressure from regulator 66 is indicated on gauge 16. Depressing valve 70 to its other axial position causes ports 71 and 72 to establish communication between gauge 16 and line 55, thereby indicating the output pressure from pressure relay 42, which is the pressure acting on valve 63 with valve 38 in the position shown in FIG. 2.

It is usual with controllers of the type described to manually control valve 63 through the operation of regulator 66 until a predetermined condition of the process desired to be controlled has been attained. This is accomplished with the valve 38 in position shown in FIG. 3. Turning the valve 38 by the knob 17 (FIG. 1) to the position shown in FIG. 3 causes the port 68 to "dead end" the line 53 leading to the pressure relay 42, thereby rendering the automatic control of valve 63 ineffective. Port 54, however, now establishes communication between line 67, 62 and 57. Consequently, the valve 63 can be controlled by the manual regulator 66 independently of the automatic controller. When the process is steady on the control point and it is desired to change to automatic control, the device 31 (FIG. 2) is adjusted so that the pressure gauge 15 is substantially the same as that on transfer gauge 16. When this has been accomplished, valve 38 is turned to the automatic position shown in FIG. 2 for automatic control of valve 63. No bump will occur at transfer due to the fact that feedback bellows 58 has been maintained at the manual loading pressure prior to switching.

When it is desired to change the control of the device 63 from automatic back to manual control, it is very important that no change in the process is occasioned by differences of control air pressure between the manual and automatic control elements. In the present invention this is accomplished by adjusting manually controlled regulator 66 until transfer gauge 16 reads the same as the output gauge 15. Valve 56 is then depressed and any difference between the reading on gauge 16 before and after depressing it is noted. If any difference occurs, regulator 66 may be adjusted in a manner such that no pressure variation occurs on transfer gauge 16 when valve 56 is again depressed.

From the foregoing it is evident that the control of device 63 may be switched from the controller including relay 42 to the manually controlled regulator 66 or vice versa without in any way affecting the process.

With the valve 38 turned to the position shown in FIG. 4, the port 54 connects lines 67 and 62 so that valve 63 can be controlled by the manual regulator 66. Port 68 connects lines 53 and 57, and port 37 connects lines 34 and 41. Accordingly, the pressure relay 42, the feedback 58 and the differential carriage 29 can be tested to determine that their various elements are functioning properly without disturbing the process desired to be controlled, which latter may, during testing, be controlled by the manual regulator 66.

Turning the valve 38 to the position shown in FIG. 5 still retains the valve 63 under the control of the manual regulator 66. However, the configuration of port 37 is such that with valve 38 in the position shown in FIG. 5, the supply to the pressure relay 42 is cut off so that the entire upper compartment 11 may be disconnected from the instrument for repair, cleaning or replacement without disturbing the process which remains under the control of the manual regulator 66.

Attention is directed to the construction of valve 38 which includes locating the port 37 at the center of the circular valve 38, thereby making it possible to surround it by the two kidney-shaped ports 54 and 68 and thereby to provide a much greater linear extent of these two ports 54 and 68 than could be obtained if port 37 were included within the path of these two ports 54 and 68. This makes it possible to provide greater angles of motion in moving the knob 17 (FIG. 1) when turning the valve 38 from automatic to manual, thereby making the ports 54 and 68 less critical relative to the extent of angular motion of knob 17.

Referring to FIG. 6, the cylindrical element 70 may be mounted for axial movement within a sleeve member 73 from a position B through a position C to a position D. The sleeve member 73 is threaded into the base of the instrument in sealing relation to a chamber 74 therein by a gasket 75. An ordinary spring check tire valve 76 of the Schrader type having a release stem 77 may be fixed in the chamber 74 between the port 72 and the line 55.

The element 70 may include sealing means such as O-rings 78 and 79. Line 69 normally is connected to port 72 through chamber 74 and when the plunger is depressed, line 55 is connected to port 72. The O-ring 79 first crosses port line 69 prior to connection of line 55 to port 72 so as to prevent interaction of automatic and manual setting. The O-ring 79 is located along element 70 at such a location that when the element is in its outermost position B, line 69 is in communication with port 72, and a surface 80 on element 70 is spaced from the valve stem 77 so that valve 76 cuts off communication between line 55 and port 71. Upon moving the element 70 inwardly to the position C shown in FIG. 6, it is apparent that O-ring 79 seals off line 69 from port 72 before surface 80 depresses stem 77 establishing communication between line 55 and port 72. In this way, the lines 55 and 69 may be connected to gauge 16 without a cross connection between lines 69 and 55 ever being established.

Referring again to FIGS. 2 and 7, it is apparent that lines 41, 53 and 57 lead into a manifold 81 associated with the controller including relay 42, and which manifold may be removed bodily from the controller so that lines 41, 53 and 57 can be separated along lines A—A of FIGS. 2 and 7. With valve 38 in the position shown in FIG. 5, it is evident that the supply line 34 is stopped off and the device 63 is under the control of the manual regulator 66. Accordingly, manifold 81 may be detached from relay 42 and the entire controller separated from the "by-pass" unit in compartment 12.

Although the various features of the new and improved pneumatic control have been shown and described in detail to fully disclose one embodiment of the invention, it will be evident that changes may be made in such details and certain features may be used without others without departing from the principles of the invention.

What is claimed is:

1. In a system for automatically and manually controlling a process such that the control can be switched from automatic to manual and vice versa without disturbing the process, the combination comprising means for measuring and indicating a measurable variable of a process to be controlled; a device for changing the measurable variable of the process; pneumatic means responsive to variations of said measurable variable for automatically operating said device; pneumatic means for manually operating said device to control the measurable variable of said process; a circular multi-position valve including a central port for connecting a source of supply air to said automatic pneumatic means; kidney-shaped ports surrounding said central port for selectively connecting said automatic pneumatic means and said manual pneumatic means to said device; a single gauge for indicating the condition of both of said pneumatic means; and valve means having at least two positions for separately connecting both of said pneumatic means to said gauge.

2. In a system for automatically and manually controlling a process such that the control can be switched from automatic to manual and vice versa without disturbing the process, the combination comprising pneumatic means including a nozzle and a flapper for measuring and indicating a measurable variable of a process to be controlled; a device for changing the measurable variable of the process; pneumatic means responsive to variations of said measurable variable for automatically operating said device; pneumatic means for manually operating said device to control the measurable variable of said process; a circular multi-position valve including a central port for connecting a source of supply air to said automatic pneumatic means; kidney-shaped ports surrounding said central port for selectively connecting said automatic pneumatic means and said manual pneumatic means to said device; a single gauge for indicating the condition of both said automatic and manual pneumatic means; and valve means having at least two positions for separately connecting both of said automatic and manual pneumatic means to said gauge.

3. In a system for automatically and manually controlling a process such that the control can be switched from automatic to manual and vice versa without disturbing the process, the combination comprising means for measuring and indicating a measurable variable of a process to be controlled; a device for changing the measurable variable of the process; a pneumatic mechanism including a nozzle and flapper responsive to variations of said measurable variable; a relay responsive to variations of pneumatic pressure in said nozzle for operating said device; pneumatic means for manually operating said device to control the measurable variable of said process; a circular multi-position valve including a central port for connecting a source of supply air to said relay; kidney-shaped ports surrounding said central port for selectively connecting said relay and said manual pneumatic means to said device; a single gauge for indicating the condition of both said relay and said manual pneumatic means; and valve means having at least two positions for separately connecting both said relay and said manual pneumatic means to said gauge.

4. In a system for automatically and manually controlling a process such that the control can be switched from automatic to manual and vice versa without disturbing the process, the combination comprising means for measuring and indicating a measurable variable of a process to be controlled; a device for changing the measurable variable of the process; pneumatic means responsive to variations of said measurable variable for automatically operating said device; pneumatic means for manually operating said device to control the measurable variable of said process; a circular multi-position valve including a central port for connecting a source of supply air to said automatic pneumatic means; kidney-shaped ports surrounding said central port for selectively connecting said automatic pneumatic means and said manual pneumatic means to said device; a single gauge for indicating the condition of both of said pneumatic means; and a cylindrical, axially movable valve having axially spaced ports for separately connecting both of said pneumatic means to said gauge.

5. In a system for automatically and manually controlling a process such that the control can be switched from automatic to manual and vice versa without disturbing the process, the combination comprising means responsive to variations of a measurable variable of a process to be controlled for measuring and indicating said variable; a device for changing the measurable variable of the process; a pneumatic mechanism including a presettable nozzle and flapper actuated by said means responsive to variations of said measurable variable for varying the pneumatic pressure within said nozzle; a relay responsive to variations of pneumatic pressure in said nozzle for operating said device; a feedback means responsive to the operation of said relay for returning said nozzle and flapper to their preset conditions; pneumatic means for manually operating said device to control the measurable variable of said process; a transfer valve connected to a source of fluid supply and to said relay; said transfer valve having means for selectively connecting either of said relay or said pneumatic means to said device and for rendering said variable responsive means ineffective while said pneumatic means is operating said device; said means for rendering ineffective also interrupting communication between said relay and said source of fluid supply; a single gauge for indicating the condition of said relay and said pneumatic means; a valve body having axially spaced ports for separately connecting said relay and said pneumatic means to said gauge; and a spring biased axially movable push button valve within said body for rendering ineffective one of said ports before rendering effective the other.

6. In a system for automatically and manually controlling a process such that the control can be switched from automatic to manual and vice versa without disturbing the process, the combination comprising means for measuring and indicating a measurable variable of a process to be controlled; a device for changing the measurable variable of the process; a pneumatic mechanism including a presettable nozzle and flapper responsive to variations of said measurable variable for varying the pneumatic pressure within said nozzle; a relay responsive to variations of pneumatic pressure in said nozzle for operating said device; a feedback means responsive to the operation of said relay for returning said nozzle and flapper to their preset conditions; pneumatic means for manually operating said device to control the measurable variable of said process; a circular multi-position valve including a central port for connecting a source of supply air to said relay; kidney-shaped ports surrounding said central port for selectively connecting said relay and said manual pneumatic means to said device and for maintaining said feedback connected to said relay or said manual pneumatic means depending upon which is effective; a single gauge for indicating the condition of said relay and said pneumatic means; and valve means having at least two positions for separately connecting said relay and said pneumatic means to said gauge.

References Cited in the file of this patent

UNITED STATES PATENTS

| | | |
|---|---|---|
| 2,369,887 | Eckman | Feb. 20, 1945 |
| 2,588,799 | Booth | Mar. 11, 1952 |
| 2,612,902 | Ward | Oct. 7, 1952 |
| 2,631,570 | Bowditch | Mar. 17, 1953 |
| 2,638,117 | Horn | May 12, 1953 |
| 2,719,535 | Anderson | Oct. 4, 1955 |
| 2,770,247 | Huston | Nov. 13, 1956 |